United States Patent [19]

Pitzer

[11] Patent Number: 4,572,439

[45] Date of Patent: Feb. 25, 1986

[54] ATTRITION RESISTANT PARTICLES AND PREPARATION OF SAME

[75] Inventor: Emory W. Pitzer, Bartlesville, Okla.

[73] Assignee: Phillips Petroleum Company, Bartlesville, Okla.

[21] Appl. No.: 556,676

[22] Filed: Nov. 30, 1983

[51] Int. Cl.[4] ............................................. B02C 19/12
[52] U.S. Cl. ........................................ 241/1; 241/14; 241/21; 241/24
[58] Field of Search .................... 241/1, 3, 14, 21, 24, 241/301, 30; 425/222

[56] References Cited

U.S. PATENT DOCUMENTS

| | | | |
|---|---|---|---|
| 2,348,780 | 5/1944 | Blaker et al. | 252/236 |
| 2,980,345 | 4/1961 | Kececioglu et al. | 241/1 |
| 3,337,328 | 8/1967 | Lawver | 241/14 X |
| 3,616,375 | 10/1971 | Inoue | 204/162 R |
| 3,811,623 | 5/1974 | Speer | 241/1 |
| 4,330,090 | 5/1982 | Montagna et al. | 241/14 |

OTHER PUBLICATIONS

1957 IRE "National Convention Record", Part 9, pp. 8-14, Frank Massa, Some Fundamentals of Transducer Design . . . .

1964 ed., "Kirk-Othmer, Encyclo. of Chem. Tech.", vol. 20, pp. 773-791, Ultrasonics, by Alfred Weissler.

©1977, Heat Systems Ultrasonics, Inc., Brochures on "Cell Disruptors" and Sonicator TM Disruptor.

*Primary Examiner*—Mark Rosenbaum
*Attorney, Agent, or Firm*—R. C. Lutton

[57] ABSTRACT

Particulate materials such as catalyst or catalyst substrate are slurried and exposed to ultrasonic energy in a rapid attrition treatment.

7 Claims, No Drawings

ATTRITION RESISTANT PARTICLES AND PREPARATION OF SAME

BACKGROUND OF THE INVENTION

In one aspect, the invention relates to attrition-resistant particles useful in catalytic processes for example. In another aspect, the invention relates to a method for preparing such attrition-resistant particles.

It is known that the life of a particle such as a fluid-type catalyst particle can be increased by an attrition treatment applied to the new catalyst before it is placed into service. This treatment is not used commercially because it is very time consuming and economically unattractive. Days or weeks are sometimes required for this treatment.

A rapid attrition treatment would be very desirable.

OBJECTS OF THE INVENTION

It is an object of this invention to provide a rapid attrition treatment for materials such as particles to be used in catalytic processes.

It is a further object of this invention to provide an attrition-resistant particle which is economical to produce and to use.

STATEMENT OF THE INVENTION

In one aspect of the invention, there is provided a process for separating the attrition-resistant particles of a particle sample from the frangible particles in the sample. The process comprises slurrying the particles of the sample into a liquid medium. Acoustical energy is then directed into the slurry. Acoustical waves having a frequency in the range of from about 10 to about 5,000,000 Kilohertz may be used. The application of the energy disintegrates the frangible particles of the sample and the attrition-resistant particles remaining can then be separated from the liquid medium leaving the disintegrated particles suspended in the liquid. In this manner, materials can be treated with only a few seconds of exposure. The frangible particles are disintegrated to a fine powder and can be separated from the liquid by filtration and recycled to an earlier step in the process. In another aspect of the invention, there are provided particles produced by the above process. The particles are especially well adapted for processes in which they would otherwise excessively attrite during use such as in catalytic processes in which the particles move. Fluid type catalysts or catalyst substrates prepared by the above process are especially desirable. Fluid type catalysts typically will have a particle size in the range of from about 20 to about 200 microns and a surface area in the range of from about 5 to 500 square meters per gram ($m^2/g$).

DETAILED DESCRIPTION OF THE INVENTION

The invention can be applied to particles of materials generally having a size in the range of from about 5 microns to about 50 millimeters usually in the range of 5 microns to 5 mm, preferably from about 5 to about 500 microns. The types of material desirably treated can generally be described as those which are somewhat frangible or brittle, especially where put to applications in which they undesirably attrite. Examples of such materials are catalysts or catalyst supports or substrates to be used in a fluidized or moving catalyst bed such as cracking catalysts. Such catalysts and catalyst substrates are frequently formed from alumina, silica, titania, germania, and, most usually are predominantly silica-aluminas. The substrate is frequently promoted and in the case of a cracking catalyst will usually contain a molecular sieve material such as a Y-zeolite. The catalyst or catalyst substrate can be promoted with Group V though VIII metal, most preferably by treatment after it has been attrition-treated in accordance with the invention for reasons of economy. Polymerization catalyst supports such as silica, alumina or aluminum phosphate particles which can be promoted with chromium trioxide for example can also be suitably treated in accordance with the invention. Materials to be used as desiccants such as calcium oxide, alumina, silica gel and the like can also be treated in accordance with the invention to provide a more attrition-resistant material.

The particles selected for treatment are slurried into a liquid medium to form a slurry. Generally, any liquid that does not dissolve the particle or any component of the particle can be employed. For catalysts or supports based on silica, alumina, silica-alumina or aluminum phosphate; water, and $C_1$-$C_{10}$ alcohols, esters, ketones and hydrocarbons can be employed, for example. At present, water is the liquid preferred because it has been tested with good results. However, on a large scale, the energy requirements of drying the particles where water was used as the liquid may be unacceptably high and in such instance a light hydrocarbon, for example, hexane, pentane, or butane may be a better choice where the liquid is to be recycled.

The concentration of particles in the slurry is not particularly critical. For economical results, it is contemplated the slurry formed should contain in the range of from about 1 to about 80 weight percent solids, usually in the range of from about 5 to about 50 weight percent solids.

Acoustical energy is directed into the slurry. Generally speaking, the acoustical waves will have a frequency in the range of from about 10 to about 5,000,000 Kilohertz (KHz), although it may be possible to use lower frequencies at considerable sacrifice in time of treatment. Usually, the acoustical waves will have a frequency in the range of from about 10 to 10,000 KHz and most preferably be in the ultrasonic range at a frequency in the range of from about 20 to about 2,000 KHz. In any event, the acoustical energy is supplied at an intensity sufficient to disintegrate the frangible particles in the sample. Generally speaking, from about 1 to about 99 weight percent of the particles in the sample used to form the slurry will be pulverized, usually in the range of from about 5 to about 50 weight percent of the particles used to form the slurry. The time of treatment will depend on the intensity of the acoustical energy supplied to the slurry. For a high through-put process however, it is desirable that the treatment last for only a few seconds, such as in the range of 1 to about 100 seconds. The acoustic intensity, measured in terms of watts per centimeters squared ($W/cm^2$) as measured in an area perpendicularly to the propagation of the acoustical wave will generally range from about 0.1 to about 100,000 $W/cm^2$, usually in the range of from about 10 to about 10,000 $W/cm^2$ and preferably in the range of from about 10 to about 2,000 $W/cm^2$ because devices capable of generating acoustical energy with an intensity within this range will satisfactorily treat the particulate material within a few seconds and are commercially available.

Generally speaking, the acoustical energy expended during treatment of the material will be within the range of from about 0.01 to about 10 kilowatt-hour per kilogram (kW·Hr/Kg) of particulate material used to form the slurry, usually in the range of from about 0.1 to about 5 kilowatt-hour per kilogram and preferably in the range from about 0.5 to about 2 kilowatt-hour per kilogram of particles used to form the slurry since an energy input within this range is relatively inexpensive and has been used to provide good result.

After treatment, the attrition-resistant portion of the slurry particles can be recovered from the liquid medium by any known means such as by decanting off the liquid medium. This portion can be dried and utilized in catalytic processes for example and the liquid can be recycled to the slurry forming step. The fines generated by the treatment will have a much smaller size than the attrition-resistant particles and therefore separation is readily achievable by filtration or centrifugation, for example. The fines can be agglomerated by pelletizing, granulating, mulling, compressing, peptizing and the like to a suitably sized particle and recycled to be slurried with the untreated particulate material to be subjected to the attrition treatment and this is preferred. Although materials other than catalysts or catalyst substrates can be treated in accordance with the invention it is contemplated that the greatest benefit of the invention will be derived from the treatment of such materials. Generally, catalysts or catalyst substrates treated in accordance with the invention will have a surface area in the range of from about 5 to about 500 square meters squared per gram, usually in the range of from about 50 to about 250 square meters squared per gram. Because enormous quantities of catalyst are circulated in fluid catalytic cracking units and moving bed units and fines generation can be severe in both types of units, the largest single application of the invention will probably be in the treatment of catalytic cracking catalysts either of the fluid or of the bead type. Fluid type cracking catalyst particles generally have a particle size in the range of 20-200 microns, and bead type cracking catalysts usually have a size in the range of 1-20 mm.

The invention as illustrated by the following example.

EXAMPLE I

This example illustrates the ultrasonic treatment of a commercial fluid cracking catalyst to make it more attrition resistant when in use in an oil cracking unit. The catalyst used for the ultrasonic treatment was an attrition-resistant Super-D FCC molecular sieve-type catalyst, marketed by Davison Chemical Division of W. R. Grace and Company, Baltimore, Md., under the product designation of Super D (sample no. SMR-1636). Pertinent properties of this catalyst (calcined at about 1000° F. for 3 hours) are summarized in Table I.

TABLE I

| Chemical Analysis | | |
|---|---|---|
| $Al_2O_3$, | Wt. % | 31.3 |
| $Na_2O$, | Wt. % | 0.58 |
| Fe, | Wt. % | 0.40 |
| $SO_4$, | Wt. % | 0.20 |
| $SiO_2$, | Wt. % | ~67 |

Physical Properties

Surface Area (BET; $N_2$)—137
Pore Volume (Hg; 50 Kpsi) cc/g—0.20

5 grams of SMR-1636 catalyst powder was slurried with 50 mL of water in a beaker. The slurry was then transferred to a treatment vessel of a model W-375 Sonicator ® Cell Disruptor, an ultrasonic disintegrator and homogenizer marketed by Heat Systems—Ultrasonics, Inc., Plainview, N.Y. and described in detail in the 1977 W-370 and W-375 Sonicator ® Disruptor brochure of Heat Systems—Ultrasonics, Inc.

The treatment vessel containing the catalyst-water slurry was then subjected for 1 minute at setting "10" to ultrasonic vibrations of 20 KHZ generated by a lead zirconate titanate ceramic transducer and transmitted by a titanium alloy "Disruptor Horn" probe immersed into the aqueous slurry. Thereafter, the supernatant liquid was immediately poured off. The above-described operation with catalyst charges of 5 grams were repeated until a total of 75 grams of the SMR-1636 catalyst had been ultrasonically treated. The combined thus treated catalyst products were washed three times by shaking with 500 mL of water and subsequent decanting of the supernatant liquid. The washed catalyst was dried at about 200° F. overnight and then heated at about 1000° F. for 2 hours.

EXAMPLE II

This example describes results of attrition resistance tests with an untreated Super D catalyst sample and a sample of this catalyst ultrasonically treated in accordance with the procedure of Example I. The resistance to attrition test was carried out essentially in accordance with "Test Methods for Synthetic Fluid Cracking Catalysts" distributed in 1966 by American Cyanamid Company, Stanford, Conn.

45 grams of either untreated or ultrasonically treated catalyst were placed into a glass tube having an inner diameter of 1.5". and a total length of 27.5". At the bottom of said tube a perforated tungsten carbide plate having holes of 0.015" diameter was installed. Attached to the top of the tube was a cone-shaped stainless steel tube having a 5" diameter at its distal end and a total length of 22". A bent glass tube of 9/16" diameter was inserted through a rubber stopper into the distal end of the stainless steel tube and connected with a vented dust collection flask.

Compressed air was introduced through the perforated plate into the catalyst tube at a flow rate of about 15.0 cubic feet per hour. The high velocity air streams passing through the holes of the perforated plates caused catalyst particles to collide with each other and with the walls of the tube causing soft parts of the catalyst to be attrited and to be carried into the dust collection flask. This flask was disconnected from the bent glass tube at certain time intervals, and the amount of collected dust was weighed. Test results for two attrition test runs (run 1 with untreated catalyst, run 2 with ultrasonically treated catalyst) are summarized in Table II.

TABLE II

| Wt-% Attrited: | Run 1 (Control) | Run 2 (Invention) |
|---|---|---|
| within 0-1 Hours | 2.8 | 0.4 |
| within 1-5 Hours | 4.6 | 0.9 |
| within 5-21 Hours | 7.6 | 0.9 |

TABLE II-continued

| Wt-% Attrited: | Run 1 (Control) | Run 2 (Invention) |
| --- | --- | --- |
| within 21–45 Hours | 7.3 | 1.3 |
| Total | 22.3 | 3.5 |

Data in Table II clearly show that the attrition of the ultrasonically treated catalyst was considerably less than that of the untreated catalyst.

What is claimed is:

1. A process for separating frangible particles of a fluidizable catalyst support from attrition-resistant particles in a sample containing both attrition-resistant and frangible particles, wherein the particles have a particle size predominantly in the range of 20 to about 200 microns; said process comprising
   (a) slurrying the particles of the sample in a liquid medium to form a slurry;
   (b) directing acoustical energy into the slurry to disintegrate the frangible particles, wherein the acoustical energy expended is in the range of from about 0.5 to about 2 kilowatt-hr/kilogram of slurried particles; and
   (c) recovering the attrition resistant particles of the sample from the liquid medium.

2. A process as in claim 1 wherein the particles are predominantly silica-alumina and the liquid is water.

3. A process for separating attrition-resistant particles from frangible particles in a sample containing both attrition-resistant and frangible particles, said process comprising:
   (a) slurrying the particles of the sample in a liquid medium to form a slurry;
   (b) directing acoustical energy into the slurry to disintegrate the frangible particles; and
   (c) recovering the attrition resistant particles of the sample from the liquid medium;
wherein the particles of the sample are of a catalyst support and are formed at least partially from at least one of alumina, silica, titania, and germania and have a size principally in the range of about 5 microns to about 50 millimeters; the liquid medium is inert to the particles; and the acoustical energy has a frequency in the range of 10 to about 5,000,000 KHz.

4. A process as in claim 1 wherein the acoustical energy is supplied at an intensity in the range of about 1 to about 10,000 $W/cm^2$ and the acoustical energy expended is in the range of about 0.1 to about 5 kilowatt-hr/kg of slurried particles.

5. A process as in claim 4 wherein the particles contain predominantly a material selected from the group consisting of silica, alumina, and silica-alumina and have a particle size predominantly in the range of 10 microns to about 1 mm and the acoustical wave has a frequency in the range of 20 to 2,000 KHz.

6. A process as in claim 5 further comprising separating the disintegrated material from the liquid medium; and agglomerating the separated disintegrated material into agglomerated particles.

7. A process as in claim 6 further comprising slurrying the agglomerated particles into the liquid medium.

* * * * *